March 24, 1964
O. B. SHERMAN
3,126,306
FABRICATING OBJECTS FROM PLASTIC MATERIALS
IN SHEET OR STRIP FORM
Original Filed Sept. 2, 1955
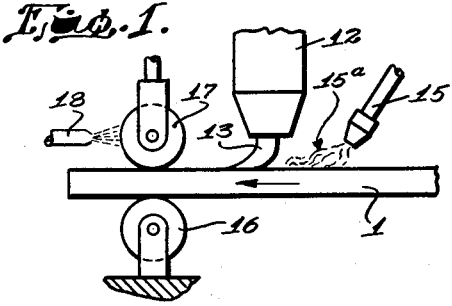
Fig. 1.
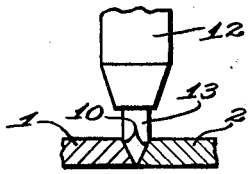
Fig. 2.
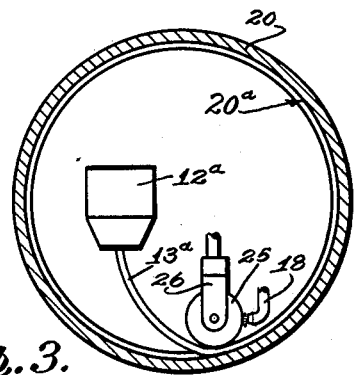
Fig. 3.
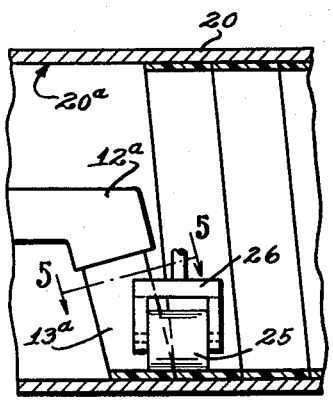
Fig. 4.
Fig. 5.
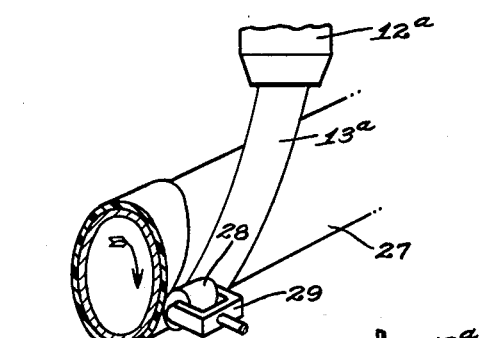
Fig. 6.
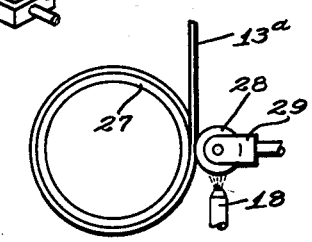
Fig. 7.
INVENTOR.
O. B. SHERMAN
BY Rule and Hoge
ATTORNEYS

United States Patent Office 3,126,306
Patented Mar. 24, 1964

3,126,306
FABRICATING OBJECTS FROM PLASTIC MATERIALS IN SHEET OR STRIP FORM
Orville B. Sherman, Toledo, Ohio, assignor to Owens-Illinois Glass Company, a corporation of Ohio
Original application Sept. 2, 1955, Ser. No. 532,165, now Patent No. 2,960,425. Divided and this application Feb. 25, 1960, Ser. No. 15,014
9 Claims. (Cl. 156—187)

My invention relates to the fabrication of various objects from plastic materials including methods of integrally uniting strips or sheets of plastic material when their edges are brought together, means and methods for extruding plastic material in sheet or strip form and fabricating the material while still in a plastic condition for forming various objects, applying interior linings to hollow or tubular articles, and covering the external surfaces of cylinders or other objects with plastic material in sheet form.

This application is a division of copending application Serial No. 532,165, filed September 2, 1955, now Patent No. 2,960,425.

The invention provides a method and means for integrally uniting the sheets or strips of plastic material by beveling their edges, bringing the beveled edges together to form a trough or V groove, extruding plastic material to fill such groove and integrally unite the parts. The invention further provides a method and means of extruding plastic material in strip form, spirally winding the strip to form a cylindrical body and integrally uniting the edges of the strip while still soft and plastic. In accordance with the present invention liners of the plastic material may be applied to the interior surface of hollow articles, tubes, and the like. The invention further provides for covering the exterior surfaces of pipes or other objects with the plastic strip material and bonding the strip edges to form a seamless covering.

Other features of the invention and the precise nature thereof will appear more fully hereinafter.

Referring to the accompanying drawings:

FIG. 1 is an elevational view, partly diagrammatic, illustrating a method of uniting the edges of strips or sheets of plastic material;

FIG. 2 is a cross-sectional view of the same;

FIG. 3 is a diagrammatic view illustrating a method and apparatus for applying plastic sheet materials an interior lining to a hollow cylindrical article;

FIG. 4 is a sectional view of the parts shown in FIG. 3;

FIG. 5 is a cross section of a strip of a plastic material, the section taken at the line 5—5 on FIG. 4;

FIG. 6 is a sectional perspective view of the apparatus for applying a strip of plastic material as a covering for a cylindrical object; and FIG. 7 is an end elevation of the apparatus shown in FIG. 6.

Referring to FIGS. 1 and 2, I have illustrated a method and means for integrally uniting strips or sheets 1 and 2 of thermoplastic material which may be softened by heating. The edges 10 of the strips 1 and 2 are beveled to provide a V-shaped space or trough when the edges are brought into contact. An extruder 12 positioned over the strips 1 and 2 continuously extrudes plastic material 13 while a relative movement of the extruder and the workpieces 1 and 2 is maintained in a direction lengthwise of the seam or edges 10. In this manner the extruded plastic 13 in a soft, plastic condition is deposited in and fills the V-shaped groove, thus integrally uniting the parts 1 and 2. The relative movement of the extruder and workpieces is effected either by moving the extruder along the seam or by advancing the parts 1 and 2 in the direction in which the seam extends.

The extruded material may be a thermoplastic which is at an elevated temperature and in a semi-fluid or soft, plastic, moldable condition when extruded and which hardens when cooled. The strips 1 and 2 are preferably locally heated to soften the material along the meeting edges in advance of the deposit of plastic material 13. Such heating is effected by a heating element 15 which comprises a nozzle through which hot air, or gas is directed along the seam. The heater 15 may be a gas torch supplying a heating flame 15$^a$. This heating is applied just in advance of the plastic 13.

The sheets 1 and 2 may be drawn lengthwise beneath the extruder and heater by a pair of rolls 16 and 17 positioned respectively beneath and above the sheets. These rolls may be driven to advance the work or the latter may be drawn forward (by means not shown) while the rolls 16 and 17 function as pressure rolls to firmly imbed the plastic material 13 in the groove and also smooth out the surface along said seam. A nozzle 18 directs a blast of cooling air or other cooling fluid against the roller 17 so that the joint is rapidly cooled and set by extraction of heat by the cooled roller. Localized cooling may also be effected by applying the cooling air directly to the extruded plastic in the groove. The strips 1 and 2 may consist of the same material as the extruded plastic 13 so that the parts are welded together to form a homogeneous body, the heating means 15 serving to facilitate such welding operation.

FIGS. 3 and 4 illustrate the invention as used for applying a lining of strip material to the interior cylindrical surface of a workpiece 20 which may be a container, pipe, tube or other object. In this form of the invention the extruder 12$^a$ is formed with an elongated discharge nozzle shaped to extrude the material in the form of a ribbon or strip 13$^a$. This strip is wound spirally on the interior surface 20$^a$ of the article 20. Such spiral winding may be effected either by rotating the extruder about the axis of the article 20 or rotating the latter about its longitudinal axis. The extruded material strip 13$^a$ is drawn outwardly at an angle such that the edges of the strip meet to form a spiral seam. As shown in section, FIG. 5, these edges 13$^b$ are parallel and inclined at acute angles to the upper and lower surfaces of the strip, the inclination being such that the edges fit together.

A roller 25 mounted in a yoke 26 is positioned within the cylinder 20 and moved in a spiral path as the material is extruded. The roller is positioned to overlie the seam substantially at the point at which the latter is being formed and is maintained in such position during the application of the strip. The roller serves to apply the plastic strip evenly to the surface 20$^a$ and also applies sufficient pressure to weld the edges of the strip together as the seam is formed thus forming an integral lining for the workpiece 20.

FIGS. 6 and 7 illustrate an apparatus for use in applying a strip of the plastic material to the exterior surface of a pipe or other object. The extruder 12$^a$ and strip 13$^a$ may be substantially the same as disclosed in FIGS. 3 and 4. The strip is wound spirally on the exterior surface of the article 27. The seam is formed and the edges welded together by a pressure roll 28 mounted in a yoke 29 and traveling along the seam as it is formed. This roll integrally unites the edges, operating in the same manner as above described in connection with the roller 25.

As noted in the opening paragraph of the specification, the invention provides a method of integrally uniting strips of plastic material when their edges are brought together while still in a plastic condition by extruding plastic material from an extruder continuously in ribbon or strip form, advancing said strip with a surface thereof in contact with another surface of plastic material and simultaneously pressing the contacting surfaces together and thereby integrally uniting said surfaces. FIGS. 3 and 4 and FIGS. 6 and 7 illustrate, respectively, the specific application of this method to the formation of cylindrical objects from thermoplastic strip material.

The extrusion head 12 (or 12ª) may be operated in the manner disclosed in the copending application of Sherman et al., Serial Number 450,604, filed August 18, 1954, now Patent No. 2,858,564, Method and Apparatus for Making Plastic Articles. The plastic material may be supplied at a uniform temperature and pressure, either continuously or intermittently, by the means and method disclosed in the copending application of Sherman et al., Serial Number 441,394, filed July 6, 1954, now Patent No. 2,871,516, Method and Apparatus for Fitting Plasticized Materials.

Modifications may be resorted to within the spirit and scope of my invention as defined in the claims.

I claim:

1. The method which comprises freely extruding heat-softened plastic material from an extruder continuously in ribbon or strip form, advancing said heat-softened strip with an edge surface thereof in abutting non-overlapping contact with an edge surface of another strip of heat-softened extruded plastic material and simultaneously pressing the edge surfaces into contact, thereby welding said edges together and, integrally uniting said strip edge surfaces.

2. The method which comprises freely extruding heat-softened plastic material in ribbon form from an extruder, concurrently winding the heat-softened strip spirally with the edges brought together in abutting, non-overlapping contact to form a spiral seam, and pressing said heat-softened edges firmly into contact as the seam is formed and thereby welding the edges of the strip together.

3. The method defined in claim 2, the extruded material being applied, as it is wound spirally, to an interior cylindrical surface, thereby forming an interior lining for said surface.

4. The method defined in claim 2, the strip of plastic material, as it is wound in spiral form, being applied to an exterior round surface and thereby forming a covering of plastic material.

5. The method of sealing elongated strips of thermoplastic material comprising the steps of freely extruding thermoplastic material as a strip having parallel spaced longitudinal edges, contacting an edge of the strip after extrusion and while the edge is still in a soft plastic state with the corresponding edge of a previously extruded strip of thermoplastic material, supporting the strips on a surface bridging the contacting edges thereof, and pressing the strip edges into contact under pressure urging the edges directly toward the support surface, said pressure being applied substantially solely directly toward the support surface, thus compressing the plastic strip edges, thereby forming a weld between said plastic strip edges.

6. A method of making a cylinder from ribbons of thermoplastic material which comprises freely extruding a hot thermoplastic material in ribbon or strip form, and thereafter winding the still heat-softened ribbon or strip spirally, with the edges brought together in abutting non-overlapping contact to form a spiral seam, supporting one side of the plastic cylinder being formed with a close-fitting cylindrical support, and pressing said still heat-softened edges forming said seam firmly into contact by pressure applied substantially solely directly toward said cylindrical support, said applied pressure compressing the seam edges and thereby forming a weld.

7. A method of making a cylinder which comprises freely extruding a hot thermoplastic material in ribbon or strip form, and thereafter winding the heat-softened ribbon or strip spirally around the outside of a cylindrical support, with the edges of said strip brought together in abutting non-overlapping contact to form a plastic cylinder having a spiral seam, and pressing said still heat-softened edges firmly into contact substantially solely by pressure applied directly against the outside surface of said plastic cylinder and directly toward said cylindrical support, thereby compressing said seam edges and forming a weld.

8. A method of making a cylinder which comprises freely extruding a hot thermoplastic material in ribbon or strip form and thereafter winding the heat-softened ribbon or strip spirally around the inside surface of a cylindrical support, with the edges of said strip brought together in abutting non-overlapping contact to form a plastic cylinder having a spiral seam, and pressing said still heat-softened edges firmly into contact substantially solely by pressure applied directly against the inside surface of said plastic cylinder and directly toward said cylindrical support, thereby compressing said seam edges and forming a weld.

9. A method of claim 6 wherein the extruded strip edges are parallel and inclined at an angle to the surfaces of said strip.

References Cited in the file of this patent

UNITED STATES PATENTS

| | | |
|---|---|---|
| 2,398,876 | Bailey | Apr. 23, 1946 |
| 2,707,017 | Beare et al. | Apr. 26, 1955 |
| 2,722,263 | Beare et al. | Nov. 1, 1955 |

FOREIGN PATENTS

| | | |
|---|---|---|
| 626,945 | Great Britain | July 25, 1949 |